April 21, 1942.  E. L. TORNQUIST  2,280,608
MULTIPLE LENSED MOTION PICTURE CAMERA
Filed Dec. 23, 1939  2 Sheets-Sheet 1

Inventor:-
Earl L. Tornquist.
By [signature]
Att'ys.

April 21, 1942. E. L. TORNQUIST 2,280,608
MULTIPLE LENSED MOTION PICTURE CAMERA
Filed Dec. 23, 1939 2 Sheets-Sheet 2

Sample Film Frames During:-
(A) Wipe-on Transition, (B) Double Exposure Transition Key:-

Normal View   Telescopic View

Inventor:-
Earl L. Tornquist.
By Barn Jackson Boucher Denner
Attys.

Patented Apr. 21, 1942

2,280,608

UNITED STATES PATENT OFFICE 2,280,608

MULTIPLE LENSED MOTION PICTURE CAMERA

Earl L. Tornquist, Elmhurst, Ill., assignor of one-half to John A. Dienner, Evanston, Ill.

Application December 23, 1939, Serial No. 310,797

5 Claims. (Cl. 88—16)

The present invention relates to multiple lensed motion picture cameras.

It has heretofore been proposed to provide a motion picture camera with telephoto lens and normal lens for projecting upon a single film at different focal lengths images of objects or scenes. It has also been proposed to provide means whereby the images may be projected upon the same frames and may be selectively thrown upon the film one at a time or simultaneously.

Such mechanisms as have heretofore been proposed are complicated and bulky and are not adapted for small size motion picture cameras such as are popular at present, particularly those using 16 mm. or 8 mm. film.

My present invention provides a simple compact mechanism for selectively throwing the image through either lens upon the film and for throwing both images upon the film with a variety of transition effects.

According to my invention a single rotating shutter serves both lenses. A mask mounted on a pivot lies closely adjacent the shutter in a parallel plane. The two thin disks, the shutter and the mask, occupy very little space and permit of a very compact construction. The pivot for the mask is extended forward through the casing at a point offset from the run of the film and hence is readily accessible for operation and may very easily be sealed against leakage of light.

The shaft for the shutter extends toward the rear and thus no interference between the mask and the shutter occurs and yet they are disposed against each other with only mechanical clearance. This provides a novel and useful construction particularly valuable for small size cameras.

Another feature of novelty in my invention is the use of a screen for the viewfinder connected for operation jointly with the mask so that the operator is apprised at the view finder of the fact that one or the other lens is in operation. Also it apprises him of the reduced area of the scene which will be recorded by the telephoto lens when the mask is in position to reveal that lens.

Two general arrangements of the mask relative to the two lenses are preferred, first, where the width of the mask is equal or substantially equal to the distance between centers of the two lenses. In that case, the effect of one view supplanting the other will be secured. That is to say, the effect will be that of peeling one view away from the other. In that case, overlap of the two views is not the object though some overlap may obviously be permitted if desired.

According to the second preferred arrangement, the width of the mask is equal to or less than the distance between the adjacent margins of the two lenses. When the mask lies between the two lenses, they both project images upon the film, resulting in a complete double exposure during the time that the two lenses are thus completely unobstructed. In moving this type of mask from one extreme position where one lens is covered, the other being meanwhile uncovered, the covered lens will first be progressively uncovered, giving a partial double exposure. Then when both lenses are uncovered there will be a complete double exposure. Thereafter, the second lens is progressively covered diminishing the area of double exposure, and, finally, when the second lens is completely covered, the first lens only registers the image upon the film. (As will be hereinafter described, the above two general arrangements may be combined in one mask to give the operator his option of one transitional effect or the other.) The reverse operation may be effected if the mask is moved back gradually while taking. If, however, the mask is moved back between the taking of successive "shots" a blank space on the film equal to the length of film between the two lenses would be produced. This space may be utilized for titles, or some operators prefer to utilize the blank dark frames as a transition from one scene to another.

The mask may be constructed of such angular width that the uncovered lens will be completely shut off before the second lens is exposed by movement of the said mask. Such construction will mean that the width of the mask is as great as the distance between opposite edges of the lenses, and will result in parts of each frame and one or more complete frames being blank as the operator switches from one lens to the other.

Registering the images produced by the two lenses upon the same frames of the film requires the lenses to be spaced a distance apart which is in effect a multiple of the unit distance or pitch between successive film frames. If a loop or take up guide or roller for the film should be provided between the lenses, then the lenses may be placed physically closer to each other or may be a distance apart which in a direct line is not an exact multiple of the frames. But measured along the film, the distance is such a multiple. A double pull down claw may be used, particularly with such a take up loop. It may be employed in any of the forms of my invention to insure that feeding of the film will be uniform under both lenses. By varying the angular width of the mask above referred to with respect to the distance between lenses, it is possible to vary the length of the double exposure and thus provide any length of transitional view necessary for accustoming the eye of the audience to the change for example of proximity and size of the object pictured. In the embodiment hereinafter described, the distance between the lenses is equal to 7 frames of film. The distance may be optionally varied. A preferred arrangement of the two lenses is to have the telephoto lens below the normal lens and the feeding of the film from top to bottom.

The combination of the single plane shutter and the single plane mask of my invention is peculiarly advantageous for use in cameras using small size film, particularly 8 mm. film. The available space between the lens and the film is so small that devices of the prior art cannot be employed. This will be more evident when it is remembered that the focal length of standard lenses for this size film is about ½".

For a more complete understanding of the nature and scope of my invention reference may be had to the following detailed description, taken in connection with the accompanying drawings which show a preferred embodiment of the invention.

Figure 2A is a fragmentary view of the feeding claw of the intermittent film feeding mechanism;

Figure 4:
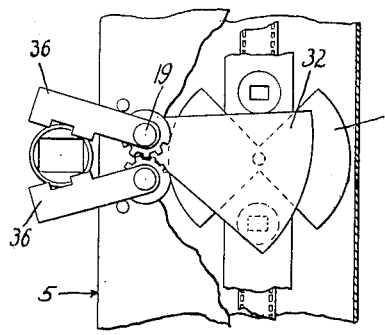
Figure 5:
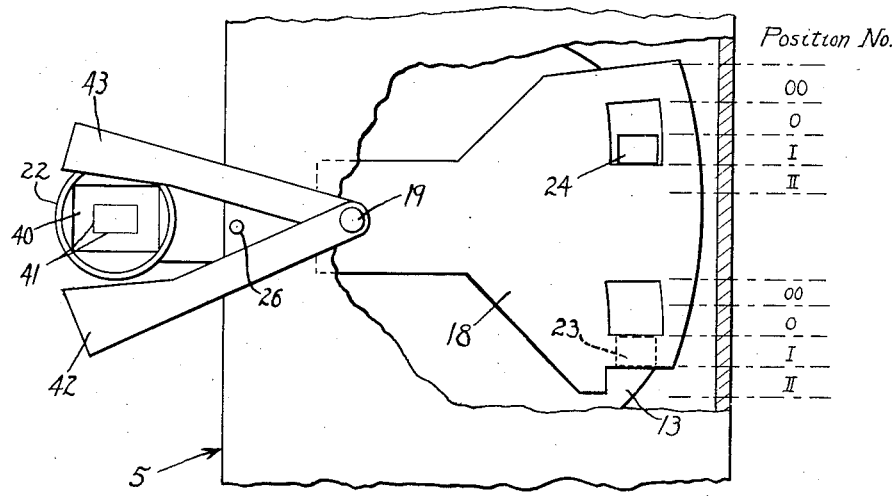
Figure 6:
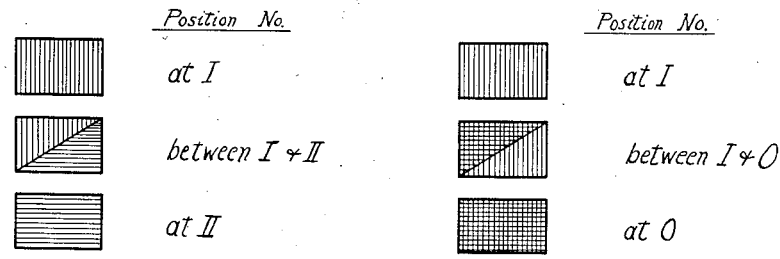
Figure 7:
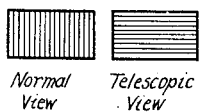
Figure 7:
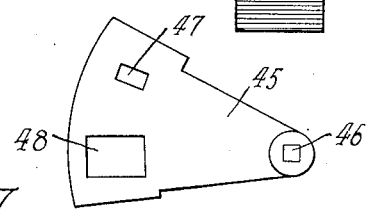

Figure 4 also shows the mid-portion of the front elevation with the lenses removed and the casing partially broken away, to show a different style shutter and a different "screen" for the view-finder;

Figure 5 shows a mid-portion of the front elevation with the casing partially broken away to show a special mask;

Figure 6 is a diagram and key for showing the two types of transition effects produced by the camera; and Figure 7 is a front elevation of a reversible screen to be employed with interchangeable normal and telephoto lenses.

Figure 1:
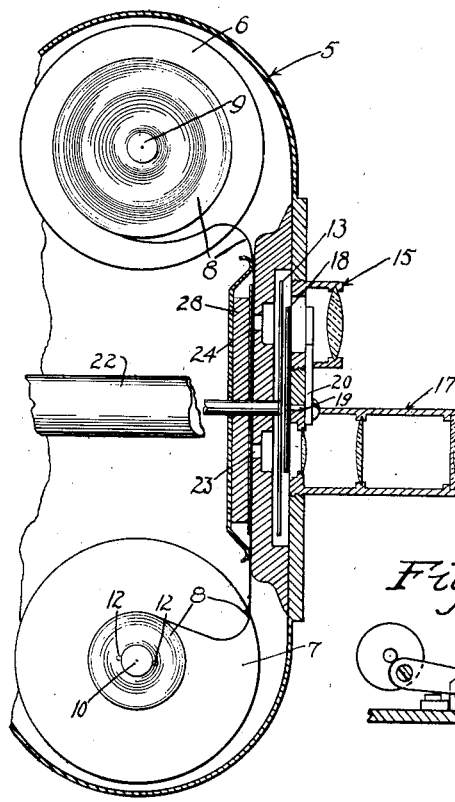
Figure 1 shows a sectional view along the line 1—1 of Figure 2.
Figure 2:
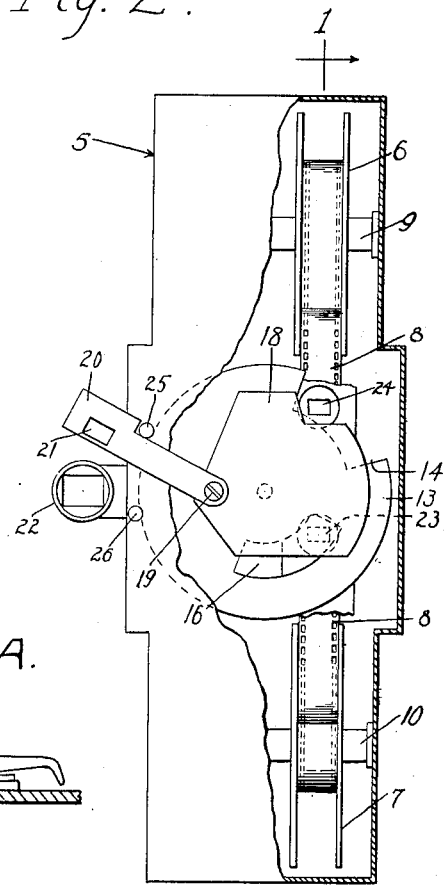
Figure 2 shows a front elevation with the lenses removed and a portion of the camera casing broken away.

Referring now particularly to Figures 1 and 2, there is shown the camera casing 5 within which are two spools 6 and 7 for the film 8. The upper spool 6 is the film-bearing spool rotating on the fixed axle 9; the lower spool 7, the film-receiving spool, is snapped on and held firmly to the driven axle 10 by the spring splines 12. The driven axle 10 is powered by a conventional spring-wound motor through a conventional gear system commonly used in motion picture cameras, which not only drives the axle 10 and feeds the film 8 as by a suitable pull down claw or claws, but also synchronizes those actions with that of the shutter 13, which is a rotating shutter common to both lenses. This single rotating shutter 13 could be readily replaced by two rotating shutters properly synchronized, or by a shutter of the butterfly type—see Figure 4, shutter 30.

The shutter 13 which cooperates with the normal lens 15 and telephoto lens 17 preferably provides an equal period of exposure for both lenses. This may be varied, however, particularly since more distant views generally provide stronger lighting effects, to give a shorter period of opening for the telephoto lens than for the normal lens. The same thing is true in the event that the lenses are distinctly of different speeds. Thus one lens may be faster than another and the corresponding shutter opening may provide exposure for $\frac{1}{100}$ of a second and the other an exposure for $\frac{1}{50}$ of a second. Even if the lenses were identical the one shutter might be faster than another in order to effect a difference in exposure for films of different character such, for instance, as black and white, or color film. That is to say, the difference in shutter speed may be employed for different speeds of lenses, for stopping motion, for different light effects, or for different film speeds or sensitivities. A shorter exposure with a telephoto lens is better because it reduces the effect of body motion when the camera is held in the hands.

With the butterfly type of shutter there will be two exposures to one revolution of the shutter, so that the shutter need be rotated only one-half as fast or, if desired, the shutter may be driven at the same speed as before, thus permitting the film to be fed twice as fast.

The shutter 13 as shown in Figure 2 has two windows, the arcuate notch 14 permitting exposure of the film behind the normal lens 15, and the arcuate slot 16 permitting exposure of the film behind the telephoto lens 17. The shaft 19 is journaled in the casing 5 through which it extends. At its inner end it carries, fixed thereto, a mask 18 which lies immediately in front of the shutter 13. At its outer end, outside the casing 5, the shaft carries fixed thereto a screen 20, which screen contains a field aperture 21, the area of which is so proportioned to the field of the telephoto lens that the field viewable through the opening 21 is substantially the same as the field of the telescopic lens.

Figure 3:
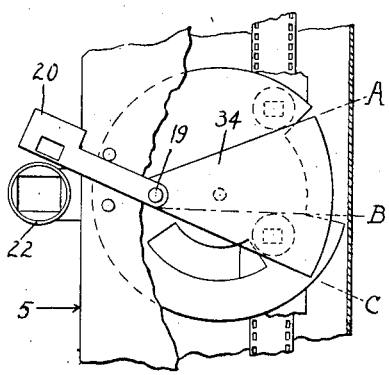
Figure 3 shows the mid-portion of the front elevation with the lenses removed and the casing partially broken away, to show a different style of "mask"

The mask 18 may take any one of a number of shapes and still perform its necessary function. In Figure 3, mask 34, and in Figure 4, mask 32, represent one of the simplest shapes the mask might take. Varying the angular width of the mask with respect to the distance between lenses may also be done and the result will be a variation in the length and type of transition. See Fig. 3, where the angular width of the mask might be made as great as or greater than the distance from A to C or as little as from B to C, or any intermediate angular width between the two.

If the width of the mask is greater than the distance from A to C, there will be minimum transitional effect when switching from the normal lens 15 to the telephoto lens 17, and a few blank film frames will result. If the width of the mask is substantially equal to the distance between lens centers, i. e., a distance from A to C, then a transitional effect is produced somewhat as though the normal view were peeled off and the telephoto view were wiped on in its place. If the mask has an angular width equal to or less than the distance between the adjacent margins of the lenses, see distance A—B, then what may be called a "double exposure" transition results wherein the film is exposed first to the normal lens then a portion of the film is exposed to both lenses, and then finally just to the telephoto lens when the mask passes in front of the normal lens. The speed with which the mask is moved from one lens to the other will also govern the extent of the transitional effect.

The screen 20 may also vary in construction. Two approaching sections of a screen plate such as split screen plate 36 of Figure 4, which comes together if either half is pressed toward the other, may be utilized. This screen plate also has the advantage of not obstructing the operator's vision as he puts it into use. Or there may be any other arrangement the purpose of which is to make a change-over from the large field to the smaller field. And it is not necessary that the mask and screen be used in coordination. There need be no screens such as screen 20 of Figure 3, or screen 36 of Figure 4, nor even field indicators 42 and 43 as in Figure 5, if desired, for the etched lines 41, of Figure 5, on the view-finder lens 40 are sufficient to indicate the proper field for use with the telescopic lens.

The screen 20 is in the position shown in Figure 2 when the normal lens 15 is in operation, for then the mask covers the aperture 23 behind the telephoto lens 17, but permits light to pass through the shutter 13 and aperture 24 to film 8.

In Figure 7 I have shown a reversible screen 45 provided with a non-circular mounting socket or opening 46 adapted to fit over a corresponding non-circular end of the shaft 19 and to be reversible by turning the screen over. The body of the screen may be made of a transparent material so that the image will not be lost during transition or movement from one position to the other. The opening 47 will register with the finder field when the cooperating mask, such as 18, 34 or 32, is in position to reveal the telephoto lens and conceal or mask the normal lens. Similarly, the opening 48 will register with the finder field when the mask reveals the normal lens and conceals or masks the telephoto lens. This reversible screen 45 of Fig. 7 is to be employed in conjunction with interchange of the position of the two lenses 15 and 17. It is apparent that by providing the front plate with sockets of the same size and threads and the lenses with the same size and thread, these lenses may be interchanged. Thus the lenses 15 and 17 may be interchanged and the screen 45 reversed.

Now, to show more clearly the sequence of operations during use of this camera, I shall describe the taking of a picture. We shall assume that the operator follows the normal procedure, i. e., the view will first be "shot" through the normal lens and then a close-up view will follow by use of the telephoto lens. Upon this assumption, the screen 20 of the view-finder 22 and the mask 18 of an angular width equal to the distance between lens centers will be in the position shown in Fig. 2. The operator will first sight the view sought to be pictured through the view-finder 22 and will then start the camera by a manual stop-start switch (not shown) controlling the spring-wound motor of a conventional design which, through a driving mechanism of a type commonly used in motion-picture cameras, will cause the feeding mechanism to start and the driven spool 7 to revolve and the shutter 13 to rotate, all in proper relation to one another. The film 8 will pass from the film-bearing spool 6 to the presser foot 28, which keeps it flat and in alignment as it is fed intermittently past the aperture 24. The rotating shutter, by means of the window 14, permits light to pass through the aperture 24 from the lens 15 to the film 8, thus exposing it. The film is then fed to the spool 7 upon which it is wound.

Assume now that a close-up of the view is desired. Instead of having to stop the camera and manually exchange lenses and view-finder, as in previous devices, the operator continues with his picture taking, never stopping the camera or losing sight of the object to be pictured. All that he needs to do is rotate the screen 20 from the position shown in Figure 2, down in front of the view-finder 22, where it is halted in the correct position by stop 26. This simple manipulation accomplishes two necessary results, first, the field of action as seen through the view-finder 22 is reduced the proper amount for use with the telephoto lens 17 and, secondly, the mask 18 is moved up in front of aperture 24 and is moved away from aperture 23, thus permitting exposure of the film 8 through the aperture 23 behind the telephoto lens 17, as the window 16 of the shutter 13 rotates past the aperture 23.

When the operator moves the screen 20 down in front of the view-finder 22 he may move it at any speed, rapidly or slowly. With a slow movement downward of the screen plate a correspondingly slow upward movement of the mask results. This, in turn, means the mask will slowly close off the aperture 24, and as slowly expose the aperture 23. The successive film frames behind aperture 24 will then be unexposed along the lower portion where the mask covers them, but then these same frames of film, when they reach aperture 23, will have the lower portion exposed by the telephoto lens 17, the upper exposed portions will here be covered by the slowly moving mask, and the remainder of each frame will then be exposed.

This will result in a series of each succeeding frame having an ever increasing lower portion composed of "telephoto" exposure and an ever diminishing upper portion of each frame composed of "normal" exposure. This wiping off of the normal view and wiping on of the telephoto view continues until the mask 18 completely covers the aperture 24, thus cutting off all exposure by the normal lens 15 and permitting complete exposure by the telephoto lens 17. The same transition as described above will result if the screen cover 20 is rapidly moved into position in front of the view-finder, but the transition will then be shorter.

As previously mentioned, the normal method of taking motion pictures is to show the normal view first, and then follow with the close-up view. Then between scenes the view-finder and mask may be moved back to their original position, as shown in Figure 2, for use with the normal lens. Since frequently the return from the telescopic view to the normal view means that there will be a change in subject-matter, the unexposed frame of film between the two lenses may indicate a location for a title or serve as a transition. But if desired, the operator may switch from the telephoto to the normal lens while the camera is running. This may result in a few of the film frames being non-exposed or having a portion of the frame exposed until the mask uncovers the normal lens again.

Obviously, the normal lens may be employed first and the telephoto afterwards to take pictures of an approaching object, such as a ship coming to the dock. In that event, the lenses may be interchanged and the screen 45 reversed if desired, or the lenses may be left as in Figures 1 and 2 and the normal lens employed first.

In Figure 5 the mask 18 is so constructed that either the "wipe-on" transition (as described immediately above) or the "double-exposure transition" may be obtained at the option of the operator.

To produce a "wipe-on" transition from exposure through the normal lens to exposure through the telescopic lens the operator proceeds as follows: He sights his object through the lens 40 of the view-finder 22 and proceeds to take as many frames as he desires. Then, pressing down on field indicator 43, which is fixed on shaft 19 journaled in case 5, the mask 18, which is also fixed on shaft 19 but at its inner end, moves upward. The indicator 43 is halted when it has reached the stop 26. In this position the telephoto lens 17 will be exclusively in operation and the lower edge of the indicator will be along the upper etched line of that portion of the view finder lens 40 which is enclosed by etched lines 41. This will indicate to the operator that he must now sight his object within that enclosed portion of the view-finder lens 40, which portion is proportionately arranged to correspond to the field of the telephoto lens 17.

Referring now to the key and the sample frames illustrated in Figure 6, it will be seen that vertical lines represent a view exposed to the normal lens 15 and aperture 24, and horizontal lines within a sample film frame represent a view exposed through the telephoto lens 17 and aperture 23. A film frame having both horizontal and vertical lines in one proportion or another, indicates that that film frame has been partially exposed through both of the lenses. The film frames resulting from the above described "wipe-on" transition are indicated in part by the sample film frames on the left side of the page under the title "Wipe-on transition." With the mask in position as shown in Figure 5, exposure will take place solely through the normal lens 15 and aperture 24, for when position I of the mask is in front of the two apertures the aperture 24 is uncovered and aperture 23 is covered, so the sample film frame for this forthcoming "wipe-on" transitional view is at present filled with vertical lines, indicating a normal lens exposure. As indicator 43 is pressed down, mask 18 moves upward correspondingly. When indicator 43 reaches stop 26 the mask 18 will have completely closed off aperture 24 and completely uncovered aperture 23, thus permitting exposure of film behind the aperture 23. This indicates that the corresponding positions II of the mask are in front of their corresponding apertures. So, referring to the sample film frames, they show "at position II" only vertical lines since only the telephoto lens through its aperture 23 is exposing the film. As the indicator was moved down toward stop 26, the mask gradually covered aperture 24, thus causing the film frames behind the aperture 24 to be only partially exposed and in diminishing amounts. But when these same film frames moved down to aperture 23, the unexposed portion was then exposed through the telephoto lens. There is no intended double exposure of the frames, since the mask has only uncovered that portion of aperture 23 which is needed to expose the remainder of each frame descending from aperture 24. When those portions of the mask between the positions I and II cover the two apertures, a film frame may be represented by half vertical and half horizontal lines, see Figure 6. As the mask nears stop 26, an increasingly larger portion of each film frame will be exposed through aperture 23 by telephoto lens 17. Representation of such transition by my key would be indicated by more and more horizontal lines replacing the vertical lines in the succeeding frames. It is the above action that produces the "wipe-on" transition.

To indicate the "double exposure" transition, refer again to Figures 5 and 6, and presently to the right-hand column of Figure 6 of sample film frames shown under the title of "Double exposure transition." The same key is used in these film frames. Starting again with mask 18 completely covering aperture 23 and completely exposing aperture 24, i. e., in position I, a film frame so exposed would again be represented solely by vertical lines, thus indicating an exposure through the normal lens. Then the operator presses upward on field indicator 42, which causes a downward motion of the mask 18, since both mask and indicator are fixed to the shaft 19 which is journaled in the casing 5. As indicator 42 moves upward, position I of the mask begins to pass down from in front of the two apertures and position O begins to take its place in front of the apertures. Since the position O in front of aperture 24 continues to leave the aperture 24 unobstructed, film exposing continues and the frames move down to aperture 23 already completely exposed. But position O of the mask gradually uncovers the aperture 23 as position O moves in place. This results in the frames exposed at aperture 24 becoming increasingly double exposed as the mask moves downward. When position O of the mask is in front of the two apertures, both lenses are permitted to expose the film since neither aperture is obstructed by the mask. So referring now to the sample film frames in the drawings, we see that "at O" shows the frame completely filled by both horizontal and vertical lines, which indicates a complete double exposure. Just above this sample frame, we see the frame as it would be "between I and O" when the double exposure is being admitted in increasing amounts upon successive film frames as position O of the mask moves into place. After position O is reached, further movement of indicator 42 toward stop 26 will move position OO of the mask in front of the apertures. As may be seen from Fig. 5, this will result in aperture 24 being gradually closed off so that when that portion of the mask halfway "between positions O and OO" is reached a sample film frame (Fig. 6) would show that the double exposure (represented by both horizontal and vertical lines) is being reduced and only the telephoto view is being completely exposed on the frames, since position OO of the mask does not obstruct aperture 23. Finally, when indicator 42 has been pushed upward as far as stop 26, the double exposure of the film frames will have been diminished farther and farther, until aperture 24 is completely shut off and the film exposure is taking place only through telephoto lens 17 and aperture 23. At this time position OO of the mask will be in front of the apertures and only the telephoto exposure will be taking place; see the last sample film frame which contains only horizontal lines. When the field indicator 42 has been moved up against stop 26, the upper edge of the indicator will be along the lower etched line 41, thus cautioning the operator that the telephoto lens is in use and he must sight within the etched lines on the view-finder lens 40.

The above description indicates that the "double exposure" transition takes place in the camera shown in Figure 5. But it is not necessary that the mask be built to allow both types of transition in the same camera. Each of the two types of transition, namely, the "wipe-on" and the "double exposure," can be separately employed by use of the appropriate mask.

I do not intend to be limited to the details shown or described except as they are recited in the appended claims, as modifications will readily suggest themselves to those skilled in the art.

I claim as my invention:

1. A moving picture camera comprising the combination of a film track, intermittent film feeding means, a pair of lenses spaced apart a multiple of frames along said track, a mask for obscuring said lenses selectively, a view finder having a field and a screen connected to said mask for indicating the field corresponding to the lense which is uncovered by the mask, said lenses being interchangeable in position and said mask being correspondingly reversible.

2. For use in a motion picture camera having two lenses mounted in relatively fixed position on said camera, a film track, said lenses disposed along said track and separated a distance equal to a multiple of film frames along said track, means for intermittently feeding said film along said track back of said lenses, shutter means operated in synchronism with said film feeding means to shut off the light from both lenses while the film is being shifted, the combination with a mask for obstructing the light passing from said lenses to said film, said mask having two windows, the corresponding edges of said windows being spaced apart a distance equal to the distance between adjacent edges of the lens openings, and one edge of the mask being spaced a distance beyond the nearest of said two windows a distance substantially equal to the width of a lense opening, said windows having openings twice as wide as the width of a lens opening.

3. For use in a moving picture camera having a casing, two lenses spaced apart longitudinally of the film, means for feeding film intermittently past the lenses, shutter means for shutting off the lenses while the film is being shifted, the combination of a pivoted platelike mask for masking the lenses, said mask having three opaque screen portions comprising a central portion and two end portions, said end portions being each of a width at least equal to the width of the field of the adjacent lens, and said central portion being spaced from each end portion by substantially twice the width of the field of the adjacent lens.

4. In a camera of the class described, a casing, a film track in the casing, a pair of lenses mounted on the front of the casing and spaced apart along the film track a multiple of frames of the film, a single plate-like shutter disposed in the casing and serving both of the lenses for alternately revealing said lenses, said shutter being mounted on a shaft lying at one side of the film track and extending rearwardly in the casing, a pivoted plate-like mask for selectively revealing said lenses, said mask lying in said casing in front of and parallel to the shutter and closely adjacent thereto, and a shaft disposed on the said one side of the film track carrying said plate-like mask, said latter shaft extending forwardly through the front of the casing and carrying manual means for adjusting the angular position of the mask.

5. The combination of claim 4 with a viewfinder, and means connected to said last named shaft for indicating in said viewfinder the selected position of said mask.

EARL L. TORNQUIST.